United States Patent [19]

Barlier et al.

[11] Patent Number: 4,532,223

[45] Date of Patent: Jul. 30, 1985

[54] TINTED OPAL GLASSES

[75] Inventors: Pernette R. M. Barlier, Vulaines sur Seine; Jean-Pierre Mazeau, Avon, both of France

[73] Assignee: Corning Glass Works, Corning, N.Y.

[21] Appl. No.: 589,993

[22] Filed: Mar. 14, 1984

[30] Foreign Application Priority Data

Jun. 21, 1983 [FR] France ................................ 83 10237

[51] Int. Cl.$^3$ ........................... C03C 3/04; C03C 3/08; C03C 3/30
[52] U.S. Cl. ........................................ 501/32; 501/57; 501/59
[58] Field of Search .............................. 501/32, 57, 59

[56] References Cited

U.S. PATENT DOCUMENTS

| | | | |
|---|---|---|---|
| 4,311,529 | 1/1982 | Danielson et al. | 501/32 |
| 4,331,769 | 5/1982 | Danielson et al. | 501/32 |
| 4,469,799 | 9/1984 | Dumbaugh, Jr. | 501/32 |

Primary Examiner—Mark L. Bell
Attorney, Agent, or Firm—C. S. Janes, Jr.

[57] ABSTRACT

This invention relates to the production of sodium fluoride opal glasses tinted in a shade lying in the range from "cream-like" to "beige" by an iron-sulfur system, the analyzed quantities of sulfur (S), sulfide ions ($S^{-2}$), iron (Fe), and ferric ions ($Fe^{+3}$) conforming to the following expressions:

$$S^{-2}/S \geq 0.15$$

$$70 \leq Fe \leq 300 \text{ ppm}$$

$$0.05 \leq Fe^{+3}/Fe^{+2} \leq 1$$

and $3 \leq S^{-2} \leq 160$ ppm when the ZnO content is below 0.1%. The glasses are especially applicable for use in culinary ware.

6 Claims, No Drawings

TINTED OPAL GLASSES

BACKGROUND OF THE INVENTION

The present invention relates to a system of colorants permitting the attainment of tinted, sodium fluoride opal glasses and, more particularly, opal glasses whose tint lies in the shades ranging from "cream-white" or "ivory" to "beige".

Opal glasses have been utilized for a long time in the fabrication of culinary articles (tableware, baking ware), the purchase of which is strongly influenced by their aesthetic appearance which is generally obtained on the one hand by the coloration in the body of the opal glass and, on the other hand, by the application of decorations added to the article after shaping. Where opal glass is concerned, a range of particularly attractive tints extends from the color "cream-white" to "ivory" and "chestnut-beige". In the lightest version (cream-white), the desired tint is notably different from that of the white opal glass products available today, being, more particularly, closer to that of certain articles of porcelain, as, for example, the porcelain known under the name of "WEDGEWOOD BONE CHINA". Of all the range, this light tint is the one which is most in demand.

The invention, which is aimed at procuring such tinted opal glasses, is concerned more especially with the manner of obtaining those tints through the use of sulfur or compounds thereof in the presence of iron in compositions of opal glass whose principal crystal phase is sodium fluoride.

The production of colored glasses through the aid of inorganic colorants has been known for a long time. The book by W. A. Weyl entitled "Coloured Glasses", published by The Society of Glass Technology, Sheffield, England (1951) describes extensively the colors produced by certain ions and suggests mechanisms leading to the coloration. More particularly, it describes the coloration of "transparent" glasses by means of iron oxide and sulfur or sulfates prepared in a reducing environment for obtaining, among others, the glasses called "ambers". The glasses generally belong to the $Na_2O$-$CaO$-$SiO_2$ system. It is generally accepted that the coloration results from centers formed through a ferric ion ($Fe^{+3}$) in tetrahedral coordination with three oxygens and a sulfide ion ($S^{-2}$), electrical neutrality being assured by the presence of a cation such as $Na^+$, for example.

The introduction of sulfur in the form of sulfides instead of sulfates or of elemental sulfur into soda lime glasses is, according to the literature (R. D. Wought, *Glass Technology*, 23, No. 6, page 259, 1982) conducive to obtaining a tint that is stable in production; melting always takes place in the presence of a highly reducing compound such as carbon.

The transposition to opal glasses of the colors obtained with certain colorant systems in transparent glasses does not always occur. For example, the use of NiO, which permits yellow and brown tints to be obtained in transparent glasses, leads to the development of gray or violet tints in the opal glasses with which this invention is concerned.

Systems of colorants appropriate to opal glasses are known, however. In particular, British Patent No. 2,077,716 is concerned with the use of the oxides of nickel, cerium, and titanium in opal glasses in which the opacifying phase is calcium fluoride, to obtain colors similar to those of the present research. Nevertheless, those glasses exhibit insufficient opacity to satisfy the new needs of the market.

French Patent No. 1,531,756 describes the production of "ivory" opal glasses from the colorant mixture ($Fe_2O_3$+$MnO_2$) with or without $TiO_2$. With this system of coloration for dark tints in similar opal glasses, it appears that, when used with articles pressed and then annealed, a non-uniform brown color generally develops on the surface which is unacceptable. The amounts of $Fe_2O_3$ and $MnO_2$ utilized were 0.70% and 1.25% by weight, respectively.

It appears that no opal glasses exist whose principal crystal phase is sodium fluoride tinted by the iron-sulfur in the presence or not of a reducing agent.

SUMMARY OF THE INVENTION

The Applicants have found it possible to develop a range of colors from "cream-white" to "beige" in sodium fluoride opal glasses by means of the iron-sulfur system in the presence or not of a reducing agent. The tint depends essentially upon the quantity of sulfur retained in the form of sulfides and the ratio between the quantity of iron present in ferric form and the total quantity of iron; the level of total iron will be limited, however, in order that the tint will not be too greenish which would detract from the aesthetic appearance of the product. Other elements such as $CeO_2$ and $MnO_2$ could possibly be added to the colorant mixture to modify the tint, especially in cases where the iron content is high.

The compositions of the tinted opal glasses of the invention, expressed in weight percent of the oxides as analyzed, consist essentially of

| | | | |
|---|---|---|---|
| $SiO_2$ | 67–74 | SrO | 0–4 |
| $B_2O_3$ | 0–3 | CaO + BaO + SrO | 0.5–5 |
| $Al_2O_3$ | 6.5–9.5 | ZnO | 0–2.5 |
| $Li_2O$ | 0–1.5 | $TiO_2$ | 0–1 |
| $Na_2O$ | 8.5–13 | $CeO_2$ | 0–0.5 |
| $K_2O$ | 0–2.4 | $MnO_2$ | 0–0.4 |
| $Li_2O$ + $Na_2O$ + $K_2O$ | 8.5–15 | $As_2O_3$ | 0–0.3 |
| CaO | 0.2–3 | $Sb_2O_3$ | 0–0.3 |
| BaO | 0–3.5 | F | 3.5–6 | and the preferred compositions consist essentially of

| | | | |
|---|---|---|---|
| $SiO_2$ | 71–73 | CaO | 0.2–1.5 |
| $B_2O_3$ | 1–3 | BaO | 1.7–3 |
| $Al_2O_3$ | 7–9 | ZnO | 0–0.5 |
| $Na_2O$ | 10.5–12.5 | F | 4–5.25 |

With regard to the colorant elements, the range of tints sought will be obtained when the analyzed quantities of sulfur (S), sulfide ions ($S^{-2}$), iron (Fe) and ferric ions ($Fe^{+3}$) will be such that $3 \leq S^{-2} \leq 160$ ppm (parts/million) with $S^{-2}/S \geq 0.15$ $70 \leq Fe \leq 300$ ppm $0.05 \leq Fe^{+3}/Fe^{+2} \leq 1$ when the glass contains an amount of ZnO less than about 0.1%.

When the glass composition contains ZnO in greater quantity, the values of analyzed sulfur can be increased up to 1500 ppm without obtaining a tint which is outside the prescribed range. It is probable that at these amounts of ZnO and ZnS, a large quantity of $S^{-2}$ is bonded to the $Zn^{+2}$ ions to form ZnS and, therefore, does not participate in the tint. The ratio $Fe^{+3}/Fe^{+2}$ remains within the limits delineated above.

The base composition should be situated within the above-mentioned limits in order to obtain an opaque material exhibiting characteristics compatible with culinary applications (tableware or baking ware). The opacity of these opal glasses is strongly linked to the amount of $Na_2O$, CaO, and fluorine which they contain; the analyzed fluorine content of these glasses is generally between 3.5–6% by weight. The upper limits of $Na_2O$, CaO, and fluorine are determined by the chemical durability desired in this type of material. With the object of improving this durability, these opal glasses also contain a certain quantity of $Al_2O_3$ and BaO; however, these oxides exhibit a major drawback of lowering the opacity of the opal glass. The maximum percentages introduced into the glass will be limited to those described previously. Furthermore, an increase in the $Al_2O_3$ content will interfere with good glass melting.

The glass compositions belonging to the above-described region permit "direct opal glasses" to be obtained, that is to say, their crystallization is practically complete during forming; however, this does not exclude a complementary heat treatment of several minutes to perfect it when the forming process involves a particularly rapid cooling. In these "direct opal glasses" the principal crystal phase is NaF; $CaF_2$, $BaF_2$, and/or $SrF_2$ are possibly present.

The level of sulfides ($S^{-2}$) permitting the range of tints sought to be obtained can be obtained in this type of opal glasses containing iron through the addition of sulfur and carbon, or through addition of sulfur compounds such as the sulfates or sulfides in the presence or not of a reducing agent.

The quantities of sulfur, sulfides, or sulfates or other compounds of sulfur and reducing agent to be introduced into the composition to obtain the level of sulfide ions ($S^{-2}$) and the ratio $S^{-2}/S$ required are strongly linked to the melting conditions of the glass (temperature, oxidizing-reducing conditions, melting time). The value of the ratio $Fe^{+3}/Fe^{+2}$ is a result of the quantity of sulfide ions contained in the glass. The glasses containing sulfides ($S^{-2}$) are reduced glasses in which the quantity of ferric ions is low; nevertheless, they are always present in sufficient quantity to form the color centers described above.

With the minimum amount of iron contained in the glass, resulting principally from impurities in the batch materials, being about 70 ppm, with less than 3 ppm sulfur in the form of sulfides ($S^{-2}$), and with a $S^{-2}/S$ ratio lower than 0.15, the tint of the glass is white and, as a consequence, is outside the ambit of the invention (Example 1). At this minimum level of iron, the increase in the concentration of sulfide ions ($S^{-2}$) and in the $S^{-2}/S$ ratio permits the colors "cream-white", "ivory", and "beige" to be obtained. Beyond 160 ppm of sulfur in the form of sulfides ($S^{-2}$), the coloration remains unchanged when the iron is at the lowest level, or the tint becomes too dark when it is at the highest level.

When the iron content in the glass is increased through outside contribution to the vitrifiable batch or by using less pure batch materials, a greener tint predominates; above 0.03% (total analyzed), the tint becomes greenish beige and, as a consequence, less attractive. In this case it would be advantageous to use $MnO_2$ and $CeO_2$ simultaneously within the respective limits of 0.4% and 0.5% to restore a more "cream-white" or "beige" coloration. Above 0.4% $MnO_2$ the tint becomes violet.

When the glass contains ZnO in a quantity higher or equal to about 0.1% by weight, the quantity of sulfide ions ($S^{-2}$) analyzed in the glass, corresponding to a given tint, is higher than that found in a glass containing only a small quantity of ZnO (<0.1% approximately). Only one part of these ions serves to form color centers with the $Fe^{+3}$ ions; the others probably combine with zinc in order to form white ZnS which, as stated above, does not participate in the tint. The ZnO content will advantageously be limited to 2.5% by weight because it has appeared more difficult to obtain the dark tints of the range sought when the ZnO content exceeds this limit.

The composition regions for the colorants are defined for conventional melting conditions, that is to say, for example, those obtained in electrically heated crucibles or in a furnace heated by gas-oxygen burners. The use of bubbling with the aid of a neutral gas (nitrogen or argon) during glass melting does not modify the tint significantly. Conversely, the use of extreme conditions is detrimental to the tint; very reducing conditions such as obtained, for example, in bubbling a mixture of argon with 5% hydrogen through the molten glass confers a gray coloration to it. Very oxidizing conditions, such as, for example, those obtained in using bubbling oxygen or in introducing nitrates, leads to a destruction of the tint (lack of $S^{-2}$ ions).

The use of $As_2O_3$ or $Sb_2O_3$ in the presence of nitrates for fining of the glass is strongly advised against because it causes a substantial modification of the tint. Conversely, it is possible to use certain compounds of arsenic, antimony, chlorine, and bromine in the absence of nitrates; their effect on the tint is sufficient weak that it can be compensated for.

The tint not only results from the level of colorants but also from the degree of opacity which, in turn, strongly depends upon the base composition (notably the fluorine content), the cooling conditions (method of forming), and any subsequent treatments. The concentration of the colorants must be adjusted for a desired tint as a function of these conditions.

DESCRIPTION OF PREFERRED EMBODIMENTS

The invention is illustrated through the examples in the following table. The glass compositions outside of the colorants are given in approximate weight percentages as batched with the exception of fluorine, for the reason that its retention varies from one method of melting to another. The concentrations of iron and sulfur are given as analyzed values for the same reasons. The batch materials employed are those conventionally utilized for the formation of glasses. The only caution is that the proportions of impurities, notably that of iron, provided by these batch materials remains within the region described above. A maximum of about 10% by weight of the glass of water may be added to the batch in order to limit dusting of the batch materials during charging thereof.

The vitrifiable batch is melted between 1400°–1550° C. under conditions representative of those that can be encountered in an industrial furnace.

The samples (50×50 mm) are then treated for 3 minutes at about 660° C. in order to simulate the decoration operation.

The diffuse reflection (R), as well as the trichromatic coordinates (x, y), for Illuminant C are determined with the aid of a colorimeter of the type "ELREPHO".

The inventive glasses are such that their trichromatic coordinates delineate a polygon having apexes defined by:

| x | 0.3050 | 0.3150 | 0.3400 | 0.3400 | 0.3250 | 0.3050 |
|---|--------|--------|--------|--------|--------|--------|
| y | 0.3150 | 0.3150 | 0.3400 | 0.3450 | 0.3450 | 0.3250 | with R = 37-85%.

The preferred tints are those of Examples 3 and 7 for, respectively, "cream-white" and "beige". In particular, and by way of comparison, a sample of "WEDGEWOOD BONE CHINA" has the properties: R=84%, x=0.3146, y=0.3250. Example 3 constitutes a good reproduction thereof. Example 1, located outside of the region of the invention, corresponds to a glass of white tint.

such that its composition corresponds to that described in the table. The coloring elements ($S^{-2}$, $Fe^{+3}$) are provided by calcium sulfate (0.42% by weight $CaSO_4$ and sugar (0.20% by weight). The iron is provided solely by the batch materials at 85 ppm (parts/million).

The batch, representing 600 grams of glass, is melted in a silica crucible, placed in a furnace at 1200° C., the temperature of the furnace then raised up to 1400° C. The total time of melting is 4 hours. At the end of four hours, the glass is poured, rolled, and annealed at 520° C. for 1 hour. 50 mm×50 mm samples are prepared therefrom and treated 3 minutes at 660° C. Thereafter, their trichromatic coordinates are measured.

EXAMPLE 15

The same vitrifiable batch is utilized as in Example 13. The coloring elements are here provided by:
iron oxide, $Fe_3O_4$—0.01% by weight
flowers of sulfur, S—0.01% by weight
wood charcoal C—0.1% by weight

TABLE

| | 1 | 2 | 3 | 4 | 5 | 6 | 7 | 8 | 9 | 10 | 11 | 12 |
|---|---|---|---|---|---|---|---|---|---|---|---|---|
| % By Weight Batched | | | | | | | | | | | | |
| $SiO_2$ | 72.51 | 72.51 | 72.51 | 72.23 | 72.51 | 72.41 | 72.51 | 72.51 | 72.43 | 71.51 | 72.14 | 71.51 |
| $B_2O_3$ | 2.00 | 2.00 | 2.00 | 2.00 | 2.00 | 2.00 | 2.00 | 2.00 | 2.00 | 2.00 | 2.00 | 2.00 |
| $Al_2O_3$ | 8.20 | 8.20 | 8.20 | 8.30 | 8.20 | 8.20 | 8.20 | 8.20 | 8.20 | 8.20 | 8.16 | 8.20 |
| $Na_2O$ | 11.50 | 11.50 | 11.50 | 11.70 | 11.50 | 11.50 | 11.50 | 11.50 | 11.50 | 10.50 | 10.40 | 10.50 |
| CaO | 0.70 | 0.70 | 0.70 | 0.80 | 0.70 | 0.70 | 0.70 | 0.70 | 0.70 | 2.70 | 2.70 | 2.70 |
| BaO | 2.20 | 2.20 | 2.20 | 2.20 | 2.20 | 2.20 | 2.20 | 2.20 | 2.20 | 1.20 | 2.20 | 1.20 |
| ZnO | — | 0.04 | 0.08 | 0.03 | 0.13 | 0.15 | 0.35 | 0.25 | 0.11 | 1.07 | 0.57 | 2.00 |
| Analyzed Quantities | | | | | | | | | | | | |
| F | 4.3 | 4.55 | 4.25 | 4.73 | 4.20 | 4.20 | 4.40 | 4.54 | 4.30 | 4.30 | 4.50 | 4.30 |
| Fe | 0.090 | 0.0115 | 0.0110 | 0.0110 | 0.0125 | 0.0210 | 0.0175 | 0.0210 | 0.0105 | 0.0090 | 0.0080 | 0.0090 |
| $Fe^{+3}/Fe^{+2}$ | 1.3 | 0.50 | 0.30 | 0.70 | 0.40 | 0.15 | 0.10 | 0.20 | <0.1 | <0.1 | <0.1 | <0.1 |
| S | 0.0067 | 0.0009 | 0.0030 | 0.0022 | 0.0072 | 0.0029 | 0.0201 | 0.0180 | 0.0098 | 0.0118 | 0.0119 | 0.1080 |
| $S^{-2}$ | — | 0.0004 | 0.0010 | 0.0007 | 0.0042 | 0.0007 | 0.0145 | 0.0145 | 0.0070 | 0.0086 | 0.0083 | 0.1030 |
| $S^{-2}/S$ | — | 0.44 | 0.33 | 0.32 | 0.58 | 0.24 | 0.72 | 0.80 | 0.71 | 0.73 | 0.70 | 0.95 |
| Tint | White | Cream White, Very Light | Cream White | Cream White | Light Beige | Beige | Dark Beige | Beige | Beige Very Light | Ivory | Cream White | Yellow Ivory |
| R % | 84.17 | 83.11 | 81.00 | 80.3 | 70.11 | 72.78 | 61.88 | 67.88 | 74.84 | 70.50 | 80.92 | 75.40 |
| x | 0.3020 | 0.3065 | 0.3147 | 0.3127 | 0.3243 | 0.3153 | 0.3360 | 0.3354 | 0.3233 | 0.3128 | 0.3171 | 0.3093 |
| y | 0.3141 | 0.3179 | 0.3244 | 0.3243 | 0.3364 | 0.3319 | 0.3407 | 0.3425 | 0.3311 | 0.3252 | 0.3274 | 0.3240 |

| | 13 | 14 | 15 | 16 | 17 |
|---|---|---|---|---|---|
| % By Weight Batched | | | | | |
| $SiO_2$ | 72.51 | 72.51 | 72.00 | 72.60 | 73.30 |
| $B_2O_3$ | 2.00 | 2.00 | 2.00 | 2.00 | 1.81 |
| $Al_2O_3$ | 8.20 | 8.20 | 8.20 | 8.20 | 7.20 |
| $Na_2O$ | 11.50 | 11.50 | 12.90 | 11.50 | 9.05 |
| $K_2O$ | — | — | — | — | 1.41 |
| CaO | 0.70 | 0.70 | 0.80 | 0.70 | 0.80 |
| BaO | 2.20 | 2.20 | 2.40 | 2.20 | — |
| ZnO | — | — | — | 0.08 | 0.42 |
| SrO | — | — | — | — | 3.02 |
| Analyzed Quantities | | | | | |
| F | 4.30 | 4.30 | 4.50 | 4.70 | 5.15 |
| Fe | 0.0085 | 0.0085 | 0.0175 | 0.0120 | 0.0150 |
| $Fe^{+3}/Fe^{+2}$ | <0.1 | <0.1 | <0.1 | 0.20 | — |
| S | 0.0040 | 0.0041 | 0.0152 | 0.0097 | — |
| $S^{-2}$ | 0.0013 | 0.0012 | 0.0118 | 0.0067 | — |
| $S^{-2}/S$ | 0.33 | 0.30 | 0.78 | 0.70 | — |
| Tint | Beige Very Light | Beige Very Light | Dark Beige | Beige | Beige Very Light |
| R % | 78.38 | 71.61 | 40.63 | 70.11 | 73.80 |
| x | 0.3184 | 0.3162 | 0.3172 | 0.3276 | 0.3257 |
| y | 0.3276 | 0.3240 | 0.3201 | 0.3362 | 0.3335 |

Two examples illustrating the invention are described below:

EXAMPLE 13

The vitrifiable batch is composed of sand, anhydrous borax, calcined alumina, sodium and barium carbonates, fluorspar, and sodium fluorosilicate in the proportions The melting and measuring of the trichromatic coordinates are effected according to the same procedure as that described in Example 13.

We claim:

1. A sodium fluoride opal glass tinted in a shade lying in the range from "cream-white" to "beige" by an iron-sulfur system, said glass having a base composition consisting essentially, expressed in weight percent as analyzed, of

| | | | |
|---|---|---|---|
| SiO$_2$ | 67-74 | Li$_2$O + Na$_2$O + K$_2$O | 8.5-15 |
| B$_2$O$_3$ | 0-3 | CaO | 0.2-3 |
| Al$_2$O$_3$ | 6.5-9.5 | BaO | 0-3.5 |
| Li$_2$O | 0-1.5 | SrO | 0-4 |
| Na$_2$O | 8.5-13 | CaO + BaO + SrO | 0.5-5 |
| K$_2$O | 0-2.4 | ZnO | 0-2.5 |
| | | F | 3.5-6 | characterized in that the analyzed quantities of sulfur (S), sulfide ions ($S^{-2}$), iron (Fe), and ferric ions ($Fe^{+3}$) conform to the following expressions:

$3 \leq S^{-2} \leq 1500$ ppm $S^{-2}/S \geq 0.15$ $70 \leq Fe \leq 300$ ppm $0.05 \leq Fe^{+3}/Fe^{+2} \leq 1$.

2. A tinted opal glass according to claim 1 containing less than about 0.1% ZnO characterized in that the analyzed quantity of sulfide ions ($S^{-2}$) lies between about 3-160 ppm.

3. A tinted opal glass according to claim 1 wherein said base composition consists essentially of

| | | | |
|---|---|---|---|
| SiO$_2$ | 71-73 | CaO | 0.2-1.5 |
| B$_2$O$_3$ | 1-3 | BaO | 1.7-3 |
| Al$_2$O$_3$ | 7-9 | ZnO | 0-0.5 |
| Na$_2$O | 10.5-12.5 | F | 4-5.25 |

4. A cream white opal glass according to claim 1 comprising a composition in approximate weight percent of

| | | | |
|---|---|---|---|
| SiO$_2$ | 72.51 | CaO | 0.70 |
| B$_2$O$_3$ | 2.00 | BaO | 2.20 |
| Al$_2$O$_3$ | 8.20 | ZnO | 0.08 |
| Na$_2$O | 11.50 | F | 4.25 | characterized by the following analyzed values:

110 ppm Fe, $0.30 Fe^{+3}/Fe^{+2}$, 10 ppm $S^{-2}$, $0.33 S^{-2}/S$.

5. A beige opal glass according to claim 1 comprising a composition in approximate weight percent of

| | | | |
|---|---|---|---|
| SiO$_2$ | 72.51 | CaO | 0.70 |
| B$_2$O$_3$ | 2.00 | BaO | 2.20 |
| Al$_2$O$_3$ | 8.20 | ZnO | 0.35 |
| Na$_2$O | 11.50 | F | 4.40 | characterized by the following analyzed values:

175 ppm Fe, $0.10 Fe^{+3}/Fe^{+2}$, 145 ppm $S^{-2}$, $0.72 S^{-2}/S$.

6. Culinary articles of tinted opal glass according to claim 1.